UNITED STATES PATENT OFFICE.

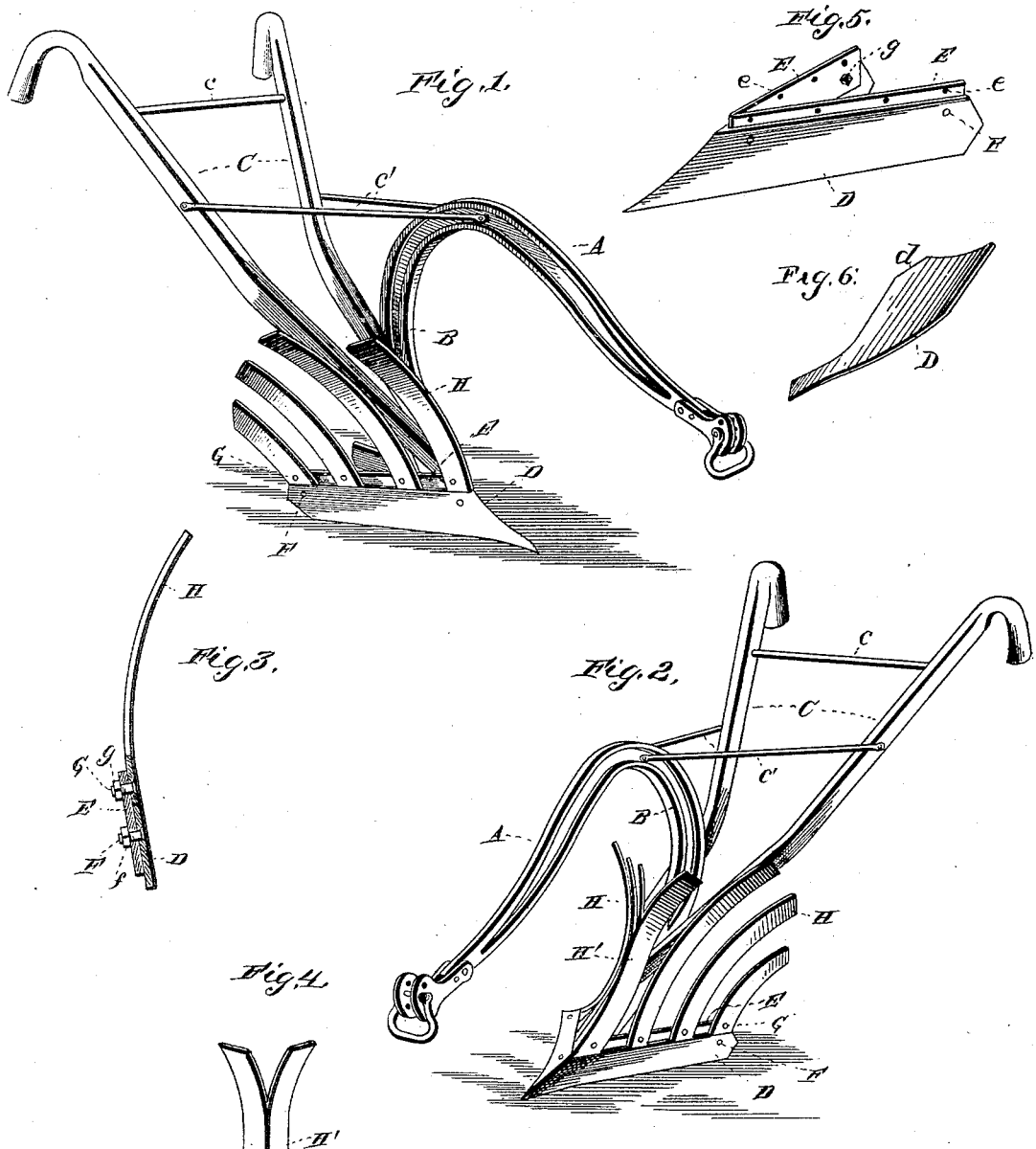

JOHN HAMMELL, OF HILL CITY, ASSIGNOR TO JULIUS B. STARR, OF CONCORDIA, AND M. W. CARNEY, OF HILL CITY, KANSAS.

OPEN MOLD-BOARD AND SHARE FOR PLOWS AND LISTERS.

SPECIFICATION forming part of Letters Patent No. 426,012, dated April 22, 1890.

Application filed December 14, 1889. Serial No. 333,702. (No model.)

*To all whom it may concern:*

Be it known that I, JOHN HAMMELL, of Hill City, Graham county, Kansas, have invented certain new and useful Improvements in Open Mold-Boards and Shares for Old-Ground Plows and Listers, of which the following is a full, clear, and exact description, reference being had to the accompanying drawings, forming a part hereof.

My invention relates to improvements in open mold-boards and shares for old-ground plows, listers, &c.; and it consists in the novel construction and arrangement hereinafter fully set forth and described.

In the drawings which illustrate the manner of carrying out my invention, Figure 1 is a perspective view of a plow, showing the open mold-board secured to the share in a suitable manner. Fig. 2 is a perspective view showing the manner in which my open mold-board is secured to the listing-plow. Fig. 3 is a sectional detail view through the shares D and E, showing the manner in which the open mold-board is secured thereto. Fig. 4 is a detail view of the front member of the mold-board which will be used on the listing-plow. Fig. 5 is a detail in perspective of the listing-plowshare, to which the open mold-board is secured; and Fig. 6 is a detail in perspective of the share, which is made without the quarter-landside. It is intended that the open mold-board is also applicable to all ordinary plows and lister-shares and to plows without landsides.

Referring to the drawings by letter, A represents the plow-beam, constructed in the ordinary manner and provided with a stock B, to which suitable handles C are secured, said handles C being provided with cross-rods $c$ and braces $c'$, which hold said handles rigid.

D are the shares, which form bearings for the open mold-board strips G and H, said share D being rigidly bolted to a sub-share E, to which are rigidly bolted the strips H, which form the mold-board for this plow.

F are the bolts which secure the shares D and sub-share E and hold them in position, said bolts F being provided with suitable nuts $f$.

G are similar bolts which secure the strips H rigidly to the sub-share E.

H' is the front section or strip, which is secured on the listing-plow. This member may be made in one or two pieces, as shown in Fig. 4, and rigidly bolted together. The shares D are to be made wingless, as represented at $d$ in Fig. 6, and the sub-share will obviate the necessity of having the quarter-landside, which has heretofore been used on all old-ground plows. Having the mold-board and shares made in this manner, the plow can be constructed much lighter and cheaper than where the mold-board is made in one piece, and will secure much more readily, and the ground plowed will be in better condition than when plowed with an ordinary plow or lister such as are now in common use, and by reason of lighter draft and the peculiar construction the plows and listers can be made of much lighter material, consequently reducing their cost; also, the cost of repairing will be greatly reduced, it being cheaper to replace a strip when worn than a full solid mold-board.

This mold-board and share may be used on all kinds of plows and listers, either walking, riding, or combined, and are very easy of construction and draft.

Having thus fully described my invention, what I claim as being new, and desire to secure by Letters Patent, is—

The combination, with the sub-shares E, of the shares D, secured thereto, the sub-share projecting above the shares, the curved metallic strips H, resting on the shares D and secured to the sub-shares E, and the angled strips H', secured to the sub-shares E E at their juncture, substantially as shown and described.

In testimony whereof I affix my signature in presence of two witnesses.

JOHN HAMMELL.

Witnesses:
B. F. POSTON,
R. B. GARNETT.